(12) United States Patent
Noda

(10) Patent No.: US 7,390,026 B2
(45) Date of Patent: Jun. 24, 2008

(54) HOUSING TYPE JOINT

(75) Inventor: Yuji Noda, Kusatsu (JP)

(73) Assignee: The Victaulic Co., of Japan, Ltd, Tokyo-To (JP)

( * ) Notice: Subject to any disclaimer, the term of this patent is extended or adjusted under 35 U.S.C. 154(b) by 0 days.

(21) Appl. No.: 11/390,318

(22) Filed: Mar. 28, 2006

(65) Prior Publication Data

US 2007/0063514 A1 Mar. 22, 2007

(30) Foreign Application Priority Data

Sep. 16, 2005 (JP) ............................. 2005-270582

(51) Int. Cl.
*F16L 17/03* (2006.01)
*F16L 17/04* (2006.01)

(52) U.S. Cl. .................. 285/112; 285/365; 285/367; 285/373; 285/420

(58) Field of Classification Search ................. 285/112, 285/364, 365, 366, 367, 373, 111, 420
See application file for complete search history.

(56) References Cited

U.S. PATENT DOCUMENTS

| | | | | |
|---|---|---|---|---|
| 2,883,211 A | * | 4/1959 | Grass | 285/233 |
| 3,464,722 A | * | 9/1969 | Larkin | 285/367 |
| 3,664,691 A | * | 5/1972 | Nakamura | 277/615 |
| 3,756,629 A | * | 9/1973 | Gibb | 285/112 |
| 3,851,901 A | * | 12/1974 | Sills | 285/112 |
| 4,417,755 A | | 11/1983 | Gittleman | |
| 4,469,354 A | * | 9/1984 | Caldwell | 285/2 |
| 5,000,487 A | * | 3/1991 | Maiville et al. | 285/2 |
| 5,658,021 A | * | 8/1997 | Matsumoto et al. | 285/112 |
| 5,722,695 A | * | 3/1998 | Matsumoto et al. | 285/23 |
| 6,896,301 B2 | * | 5/2005 | Brice | 285/364 |
| 2005/0189768 A1 | | 9/2005 | Avram et al. | |
| 2005/0248098 A1 | | 11/2005 | Sisk et al. | |
| 2005/0258641 A1 | * | 11/2005 | Gibb | 285/112 |

* cited by examiner

*Primary Examiner*—James M Hewitt
(74) *Attorney, Agent, or Firm*—Jacobson Holman PLLC

(57) ABSTRACT

A housing type joint including: a housing formed by arranging at least three arcuate segments in a circumferential direction with gaps; an elastic ring arranged in the housing for hermetically sealing end portions of a pair of pipes; a fastening band arranged so as to surround an outside surface of the housing and having loop portion at both ends thereof; and a fastening unit that makes the loop portions at both ends of the fastening band closer to each other, in order to make the arcuate segments closer to each other or in contact with each other; wherein the elastic ring has engagement projections at positions located in a circumferential direction thereof with gaps, correspondingly to the respective arcuate segments, each engagement projection extending outward in a radial direction of the elastic ring; each arcuate segment has a positioning hole into which each engagement projection is inserted; and a fastening-band guiding part is provided on an outside surface of each arcuate segment for guiding the fastening band.

4 Claims, 6 Drawing Sheets

HOUSING TYPE JOINT

FIELD OF THE INVENTION

This invention relates to a housing type joint for hermetically sealing two pipes whose edge portion has a circular groove, in particular, to a housing type joint that is lightweight and compact and easy to be attached and removed.

BACKGROUND ART

As a housing type joint that hermetically seals connecting portions of small-diameter pipes such as water-supply pipes, a housing type joint having a structure shown in FIG. 8 is used in various industrial fields.

The housing type joint as shown in FIG. 8 consists of: a pair of semicircular joint segments 1, 2 made by casting; bolt seats 3, 3 integrally formed at both end portions of one semicircular joint segment 1; bolt seats 4, 4 integrally formed at both end portions of the other semicircular joint segment 2; a space 7 formed in the semicircular joint segments 1, 2 for containing end portions of two pipes 5, 6; an elastic ring 8 arranged in the space 7 formed in the semicircular joint segments 1, 2 for sealing the end portions of two pipes 5, 6; two fastening portions 9, 10 that form both side walls of the space 7 in the semicircular joint segments 1, 2 and that are engaged in circumferential grooves 5a, 6a provided at the end portions of two pipes 5, 6; and two bolt-nut fastening units 11 that are inserted through openings 3a, 4a provided at the bolt seats 3, 4 of the semicircular joint segments 1, 2 for making the semicircular joint segments 1, 2 closer to each other or in contact with each other.

When the elastic ring 8 arranged in the space 7 of the semicircular joint segments 1, 2 is pressed to outside surfaces of the end portions of the two pipes 5, 6, the end portions of the two pipes 5, 6 are hermetically sealed. In addition, when the fastening portions 9, 10 provided at the semicircular joint segments 1, 2 are engaged in the circumferential grooves 5a, 6a provided at the end portions of the two pipes 5, 6, positions of the two pipes 5, 6 are fixed.

However, in the above conventional housing type joint, the semicircular joint segments 1, 2 are made by casting. Thus, the total weight of the housing type joint is heavy and it is difficult to make the housing type joint compact. In addition, it is not easy to assemble the housing type joint at a workplace as well as to attach and remove the housing type joint to and from the two pipes.

SUMMARY OF THE INVENTION

This invention is intended to solve the above problems. That is, the object of this invention is to provide a housing type joint easy to be assembled at a workplace as well as easy to be attached to and removed from pipes.

This invention is a housing type joint comprising: a housing formed by arranging at least three arcuate segments in a circumferential direction with gaps; an elastic ring arranged in the housing for hermetically sealing end portions of a pair of pipes; a fastening band arranged so as to surround an outside surface of the housing and having loop portions at both ends thereof; and a fastening unit that makes the loop portions at both ends of the fastening band closer to each other, in order to make the arcuate segments closer to each other or in contact with each other; wherein the elastic ring has engagement projections at positions located in a circumferential direction thereof with gaps, correspondingly to the respective arcuate segments, each engagement projection extending outward in a radial direction of the elastic ring; each arcuate segment has a positioning hole into which each engagement projection is inserted; and a fastening-band guiding part is provided on an outside surface of each arcuate segment for guiding the fastening band.

According to the present invention, since the housing is formed by the at least three arcuate segments and each engagement projection extending outward in a radial direction provided at the elastic ring is inserted (fitted) into each positioning hole provided at each arcuate segment, it is easy to position the housing with respect to the elastic ring. That is, the elastic ring and the housing can be easily arranged at respective suitable positions with respect to a seam of the pipes. In addition, since an attaching operation of the housing type joint is completed by fastening the housing by means of the fastening band and the fastening unit, an assembling operation and an attaching/removing operation of the housing type joint can be easily conducted at a workplace.

In addition, if the arcuate segment is made from a metal plate, it is possible to make the housing type joint more lightweight and more compact. In addition, the housing type joint can be assembled without using any welding means or any parts such as small screws, so that efficiency of parts management may be improved.

DESCRIPTION OF THE PREFERRED EMBODIMENT

Hereinafter, an embodiment of a housing type joint according to the present invention is explained with reference to attached drawings.

Figure 1:
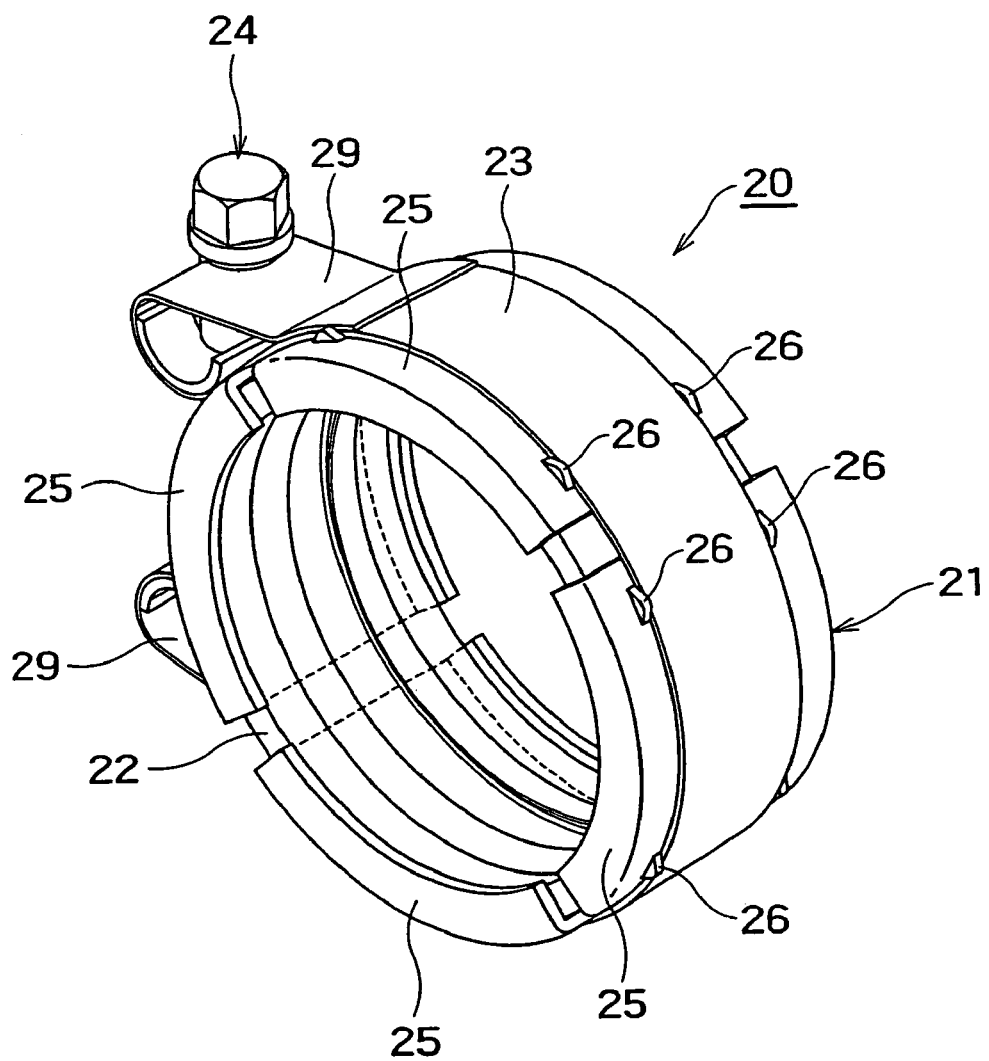
FIG. 1 is a perspective view showing an embodiment of a housing type joint according to the present invention.
Figure 2:
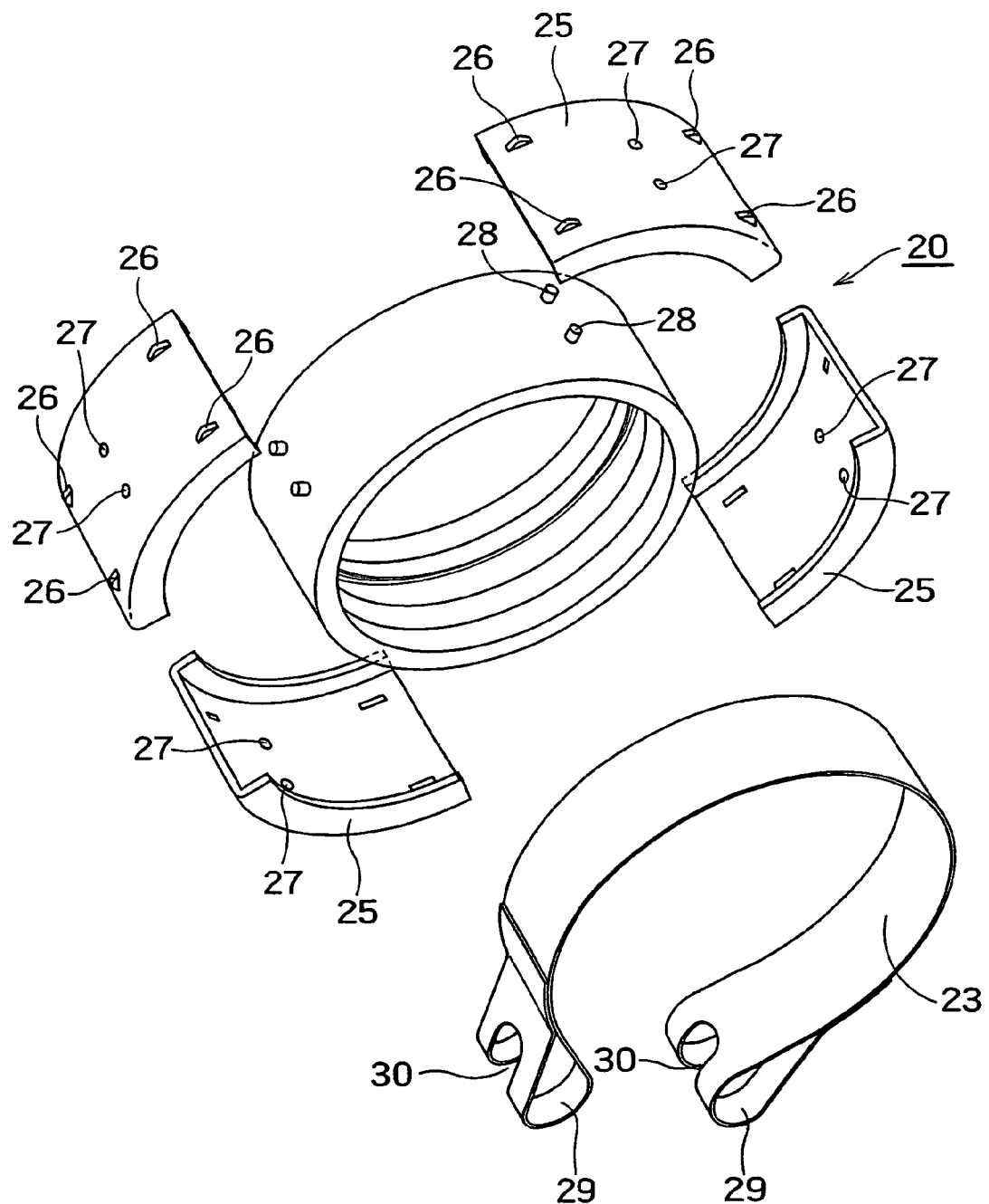
FIG. 2 is an exploded perspective view of the housing type joint of FIG. 1.

FIG. 1 is a perspective view showing an embodiment of a housing type joint according to the present invention. FIG. 2 is an exploded perspective view of the housing type joint of FIG. 1.

As shown in FIGS. 1 and 2, the housing type joint 20 of the present embodiment consists of: a housing 21, an elastic ring 22 arranged inside the housing 21, a fastening band 23 arranged so as to surround an outside surface of the housing 21, and a fastening unit 24 connected to both ends of the fastening band 23.

Figure 8:
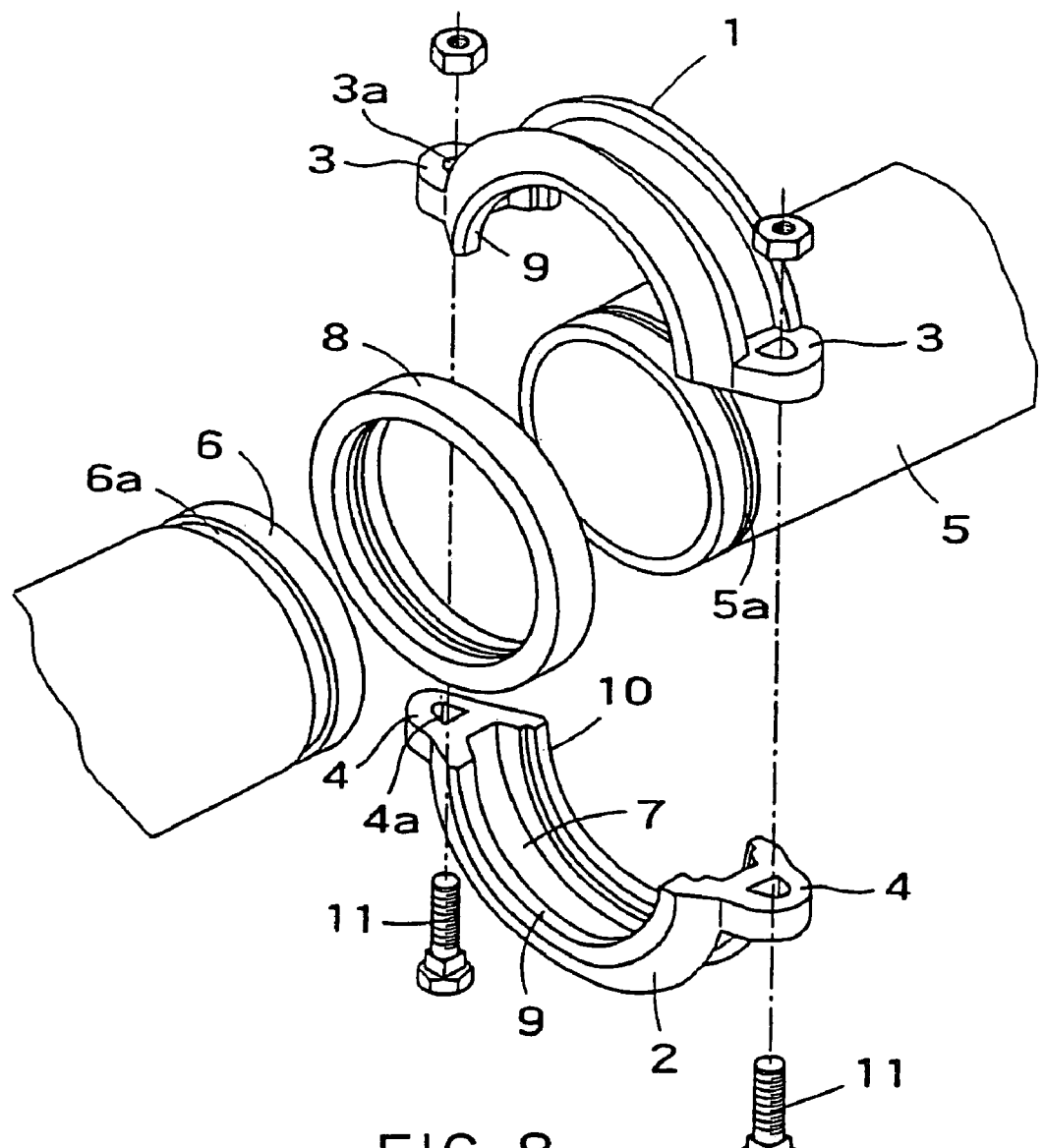
FIG. 8 is an exploded perspective view of a conventional housing type joint.

The housing 21 is formed by arranging four arcuate segments 25, 25, 25, 25 in a circumferential direction with gaps on or above an outside surface of the elastic ring 22. In the present embodiment, the four arcuate segments 25 have the same shape, and each arcuate segment 25 is a substantially plate-like (planar) member whose section forms an arc of substantially 90 degrees. For example, each arcuate segment 25 is formed as follows: A metal sheet such as a stainless-steel sheet is cut into a longitudinal rectangular shape so as to form a housing blank. The housing blank is formed into a shape whose section is a substantially inverse U-shape, as shown in FIG. 2, by means of a shape-forming unit not shown. Then, the housing blank formed into the shape whose section is a substantially inverse U-shape is curved into an arcuate shape of a substantially quarter circle. The end portions (side end portions) of the inverse U-shape of the arcuate segment 25 serve as fastening parts, which engage with circumferential grooves 5a, 6a provided at end portions of two pipes 5, 6 (see FIG. 8).

Each arcuate segment 25 has four fastening-band guiding parts 26, 26, which are formed by cutting and raising four parts of the arcuate segment 25 located at both side portions of both end portions thereof. In addition, each arcuate segment 25 has two positioning holes 27, 27 at both side portions of a circumferential central portion thereof. The fastening band 23 is arranged between the two pairs of fastening-band guiding parts 26, 26 formed on the outside surface of each arcuate segment 25.

Of course, the fastening-band guiding parts 26 of the arcuate segment 25 may be formed by attaching separate guiding pieces onto the both side portions of the arcuate segment 25. In addition, the positioning holes 27 of the arcuate segment 25 may be formed at both side portions of circumferential end portions thereof. Alternatively, one positioning hole 27 of the arcuate segment 25 may be formed at a central portion in width of a circumferential central portion thereof.

For example, the elastic ring 22 is made from rubber, and formed into a cylindrical shape. Especially, it is preferable that the elastic ring 22 has a lip-type of automatic-sealing mechanism, which achieves a stable sealing force corresponding to any inside pressure and any outside pressure.

Figure 3:
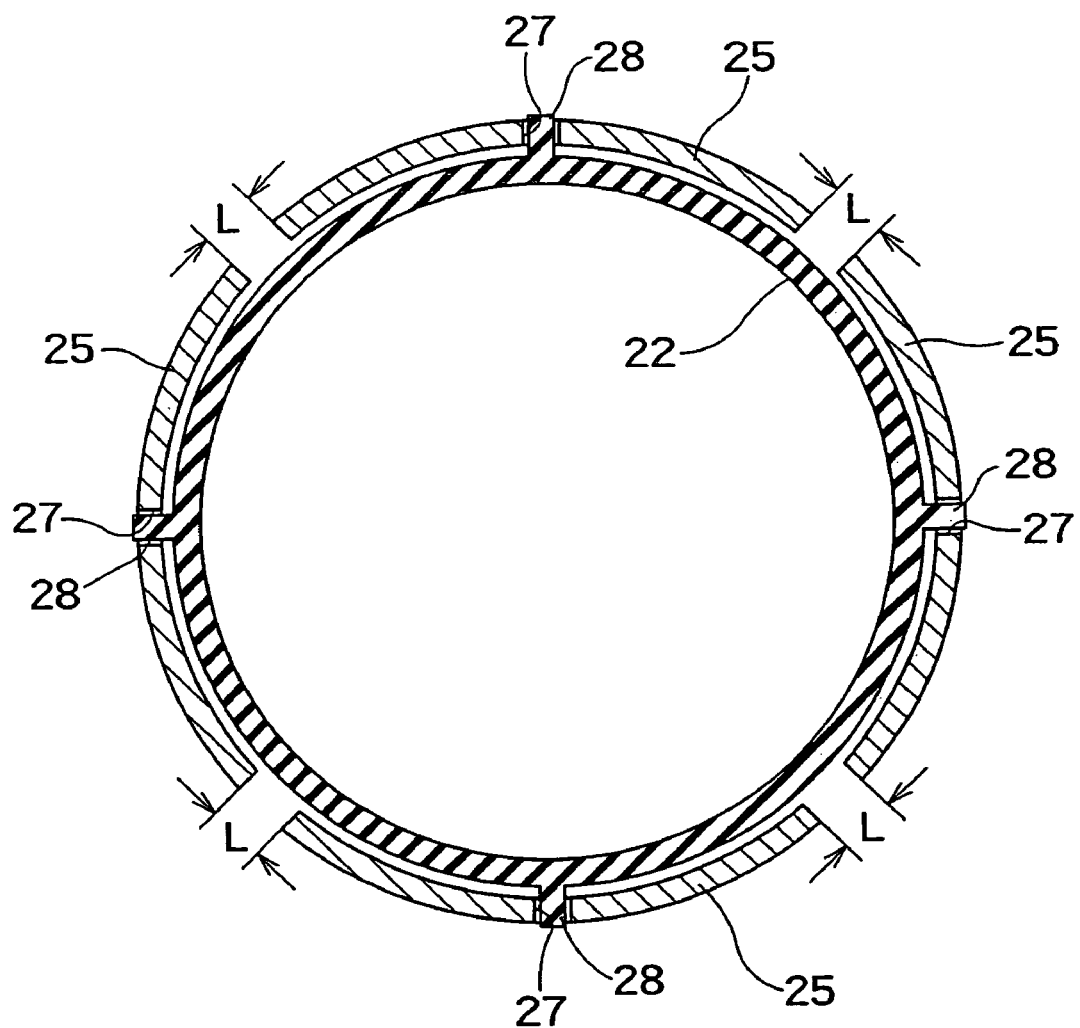
FIG. 3 is a sectional view showing a positional relationship between an elastic ring and arcuate segments forming an housing, in the housing type joint of FIG. 1.

As shown in FIGS. 2 and 3, engagement projections 28, 28 extending outwardly in a radial direction of the elastic ring 22 are arranged on both side portions of the elastic ring 22, in a circumferential direction with gaps of 90 degrees. The positioning holes 27, 27 of the arcuate segments 25 are inserted by the engagement projections 28, 28 of the elastic ring 22. Thus, the arcuate segments 25 are fixed on the outside surface of the elastic ring 22 with the same gaps L.

The fastening band 23 is made of a stainless-steel plate cut into a longitudinal rectangular shape, for example. Each end portion of the fastening band 23 forms a loop portion 29. At each loop portion 29, the end portion of the fastening band 23 is bent so as to be overlapped on the outside surface of a main body of the fastening band 23, in order to form a loop. In addition, a circular hole 30 is formed at each loop portion 29.

Figure 6:
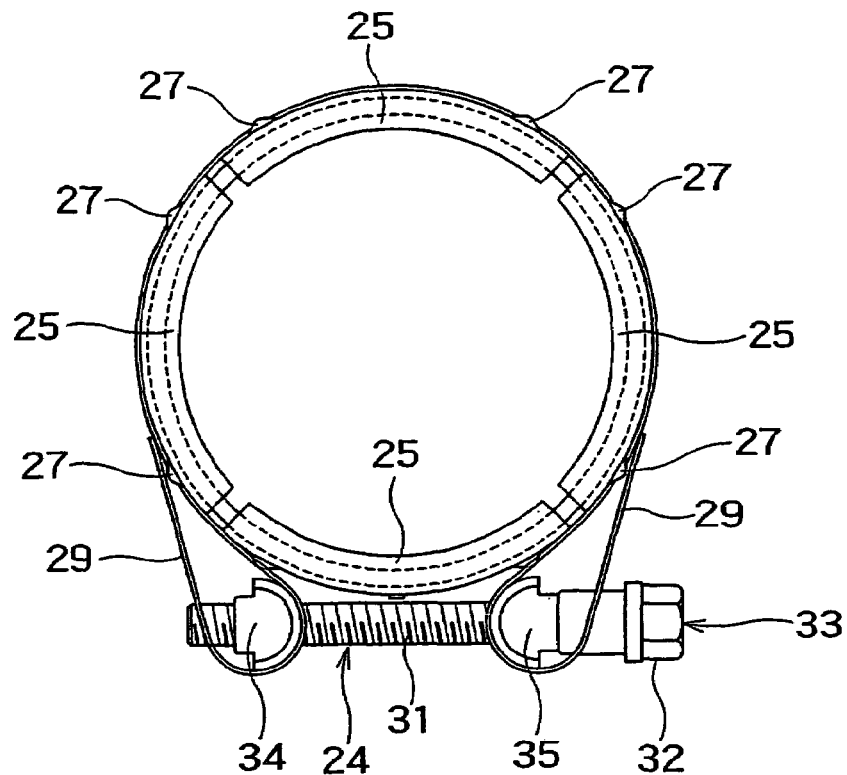
FIG. 6 is a sectional view showing the state wherein the housing type joint of FIG. 1 is arranged on the end portions of the pipes to be sealed.
Figure 7:
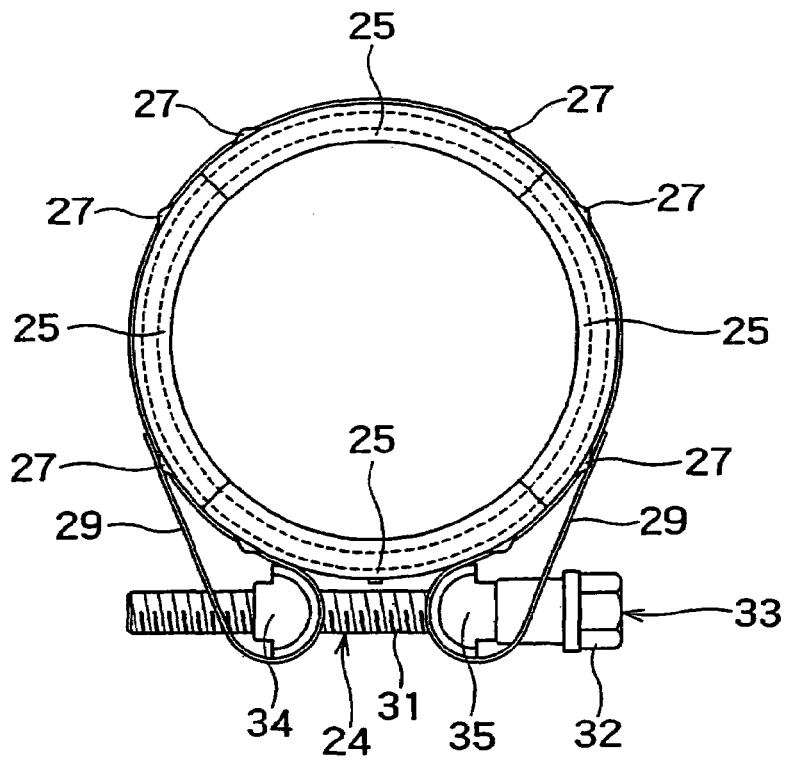
FIG. 7 is a sectional view showing the state wherein the housing type joint of FIG. 1 is attached on the end portions of the pipes to be sealed.

As shown in FIGS. 6 and 7, the fastening unit 24 of the present embodiment includes: a bolt 33 having a screw portion 31 and a head portion 32, a nut 34 threadedly engaged with the screw portion 31 of the bolt 33, and a loop-pressing part 35 integrally formed between the screw portion 31 and the head portion 32 of the bolt 33.

Then, the nut 34 is positioned in one loop portion 29 of the fastening band 23, and the loop-pressing part 35 is positioned in the other loop portion 29 of the fastening band 23. Opposite surfaces of the nut 34 and the loop-pressing part 35 via the loop portions 29 are arcuate surfaces.

Next, an operation of the housing type joint 20 of the present embodiment is explained.

The housing type joint 20 of the present embodiment is assembled in a manufacturing factory in accordance with the following steps.

At first, as shown in FIG. 2, the four arcuate segments 25 are arranged on the outside surface of the elastic ring 22. The positioning holes 27, 27 of each arcuate segment 25 are aligned with (positioned to) the engagement projections 28, 28 of the elastic ring 22.

Then, the arcuate segments 25 are pressed to the outside surface of the elastic ring 22, so that the engagement projections 28, 28 of the elastic ring 22 are engaged in the positioning holes 27, 27 of each arcuate segment 25, as shown in FIG. 3. Thus, the four arcuate segments 25 are attached onto the elastic ring 22 with the circumferential gaps L.

Next, the fastening band 23 is arranged so as to surround the outside surfaces of the four arcuate segments 25. Then, the fastening unit 24 is attached to the loop portions 29 formed at the both end portions of the fastening band 23, as described above (see FIG. 6). Thus, the assembling operation of the housing type joint 20 of the present embodiment is completed.

Figure 4:
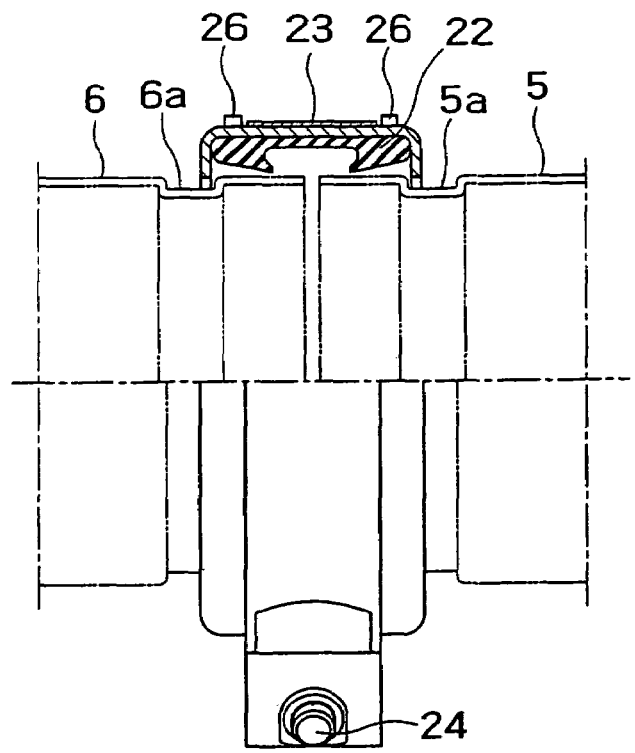
FIG. 4 is a side partial-sectional view showing a state wherein the housing type joint of FIG. 1 is arranged on end portions of pipes to be sealed.
Figure 5:
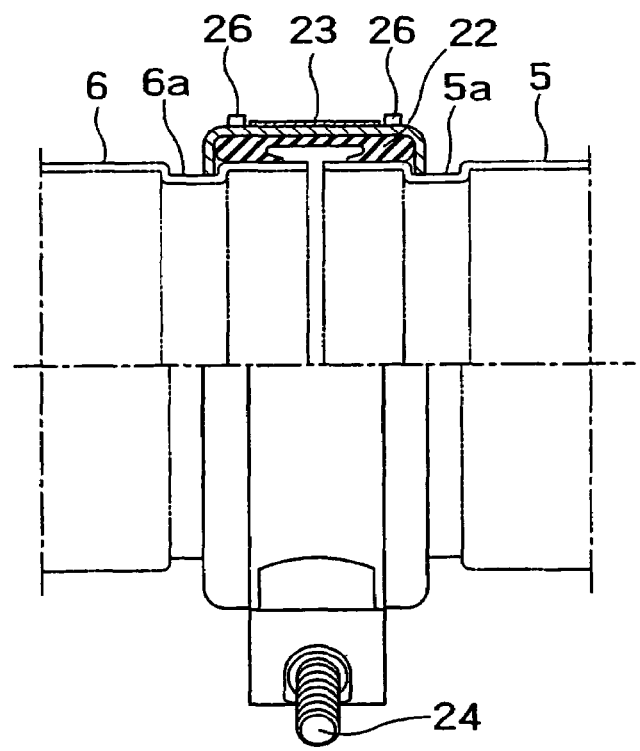
FIG. 5 is a side partial-sectional view showing a state wherein the housing type joint of FIG. 1 is attached on the end portions of the pipes to be sealed.

In order to apply the housing type joint 20 of the present embodiment for a seam of pipes, the housing type joint 20 assembled in the manufacturing factory is mounted on the pipes 5, 6 at a job site in such a manner that the elastic ring 22 surrounds the seam of the pipes 5, 6, as shown in FIGS. 4 and 6. In the case, the inside diameter of the elastic ring 22 has to be set larger than the outside diameter of the pipes 5, 6.

Then, the fastening parts of the arcuate segments 25 forming the housing 21 are arranged correspondingly to the circumferential grooves 5a, 6a provided at the end portions of the two pipes 5, 6.

Then, the bolt 33 of the fastening unit 24 mounted on the fastening band 23 is turned in a fastening direction. Thus, the distance between the loop-pressing part 35 provided at the bolt 33 of the fastening unit 24 and the nut 34 threadedly engaged with the screw portion 31 is changed from a position (situation) shown in FIG. 6 to a position (situation) shown in FIG. 7. Thus, the four arcuate segments 25 forming the housing 21 move from their positions shown in FIG. 6 to their positions shown in FIG. 7, so that the gaps L between the four arcuate segments 25 forming the housing 21 become substantially zero. As a result, the housing 21 becomes circular. When the housing 21 becomes circular, the both side portions (fastening parts) of the housing 21 (arcuate segments 25) are engaged in the circumferential grooves 5a, 6a at the end portions of the two pipes 5, 6, so that the housing 21 is fixed at the end portions of the two pipes 5, 6.

When the housing type joint 20 is fastened, the arcuate segments 25 cannot bite the elastic ring 22 because the arcuate segments 25 are arranged at the same intervals with respect to the elastic ring 22. Thus, it is unnecessary to set up the arcuate segments 25 by means of a jig such as a stainless-steel plate.

In addition, the housing type joint 20 of the present embodiment is delivered to the job site under a state assembled in the manufacturing factory, the housing type joint 20 is easily arranged at an appropriate position for the seam of the two pipes 5, 6 at the job site, and the housing type joint 20 is easily fixed only by fastening the fastening band 23. In addition, removal of the housing type joint 20 may be also conducted only by loosening the fastening band 23. Thus, compared with the conventional housing type joint, the housing type joint 20 of the present embodiment is easy to be attached to and removed from the pipes.

In addition, if the four arcuate segments 25 forming the housing 21 are formed by metal plates, the housing type joint 20 may be remarkably lightweight, compared with the conventional one. In addition, it is unnecessary to form a bolt-supporting structure at the housing 21, so that the housing type joint 20 may be made more compact.

The housing type joint 20 of the present embodiment can be directly applied to end portions of conventional pipes with circumferential grooves. That is, the housing type joint 20 is compatible to the conventional housing type joint.

Herein, in the above embodiment, the housing 21 is formed by the four arcuate segments 25. However, the housing 21 may be formed by three arcuate segments or by five or more arcuate segments.

The invention claimed is:

1. A housing joint comprising:
    a housing formed by arranging at least three arcuate segments in a circumferential direction with gaps,
    an elastic circular ring arranged in the housing for hermetically sealing end portions of a pair of pipes,
    a fastening band arranged so as to surround an outside surface of the housing and having loop portions at both ends thereof, and
    a fastening unit that makes the loop portions at both ends of the fastening band closer to each other, in order to make the arcuate segments closer to each other or in contact with each other,
    the elastic circular ring having engagement projections at positions located in a circumferential direction thereof corresponding to the respective arcuate segments, each engagement projection extending outward in a radial direction from the elastic circular ring,
    each arcuate segment having a positioning hole into which each engagement projection is inserted, and
    a fastening-band guiding part located on an outside surface of each arcuate segment for guiding the fastening band.

2. The housing joint according to claim 1, wherein
    the number of the arcuate segments is four, and
    each arcuate segment has a shape of a substantially quarter circle.

3. The housing joint according to claim 1, wherein
    each arcuate segment is made by forming a metal plate into a substantially inverse U-shape.

4. The housing joint according to claim 1, wherein
    each fastening-band guiding part of each arcuate segment is formed by cutting and raising a part of each arcuate segment.

* * * * *